(12) United States Patent
Ma et al.

(10) Patent No.: US 7,102,826 B2
(45) Date of Patent: Sep. 5, 2006

(54) TELECENTRIC SINGLET HAVING A SMALL HEIGHT REQUIREMENT

(75) Inventors: Guolin Ma, Milpitas, CA (US); Dave Pitou, San Jose, CA (US)

(73) Assignee: Avago Technologies Sensor IP Pte. Ltd., Singapore (SG)

( * ) Notice: Subject to any disclaimer, the term of this patent is extended or adjusted under 35 U.S.C. 154(b) by 500 days.

(21) Appl. No.: 10/087,278

(22) Filed: Mar. 1, 2002

(65) Prior Publication Data
US 2003/0165023 A1 Sep. 4, 2003

(51) Int. Cl.
*G02B 3/00* (2006.01)

(52) U.S. Cl. .................. 359/642; 359/708; 359/718

(58) Field of Classification Search ............. 359/642, 359/708, 718, 719, 738
See application file for complete search history.

(56) References Cited

U.S. PATENT DOCUMENTS

| | | | |
|---|---|---|---|
| 4,729,645 A * | 3/1988 | Suda | ............ 359/719 |
| 5,940,214 A | 8/1999 | Suzuki et al. | |
| 5,949,577 A | 9/1999 | Ogata | |
| 5,999,327 A | 12/1999 | Nagaoka | |
| 6,055,105 A | 4/2000 | Boku et al. | |
| 6,154,323 A * | 11/2000 | Kamo | ............ 359/691 |
| 6,297,915 B1 * | 10/2001 | Kaneko et al. | ............ 359/718 |
| 6,349,000 B1 * | 2/2002 | Yamagata et al. | ............ 359/575 |
| 6,507,443 B1 * | 1/2003 | Kitagawa | ............ 359/718 |
| 2002/0167628 A1 * | 11/2002 | Yoon | ............ 349/106 |
| 2003/0112527 A1 * | 6/2003 | Curtis et al. | ............ 359/719 |

FOREIGN PATENT DOCUMENTS

JP 11-183794 * 7/1999 ............ 359/719

OTHER PUBLICATIONS

English Translation of the document JP11-183794.*

* cited by examiner

*Primary Examiner*—Huy Mai

(57) ABSTRACT

A single lens that has a small spot size across a large field of view and a small height. The lens has a first surface for performing color correction functions and a second surface for primarily performing light ray bending functions. The first surface has diffraction efficiency improvement mechanism for improving the resolution of the lens. The lens also has a vignetting reducing mechanism for reducing the amount of vignetting in the corners of the image.

19 Claims, 4 Drawing Sheets

TELECENTRIC SINGLET HAVING A SMALL HEIGHT REQUIREMENT

FIELD OF THE INVENTION

The present invention relates to optics, and more specifically, to a telecentric singlet having a small height requirement that is especially suited for space critical applications.

BACKGROUND OF THE INVENTION

An important component in any imaging application is the lens design. When space is not an issue, a lens design typically utilizes more than two separate lenses in the lens design. For example, a first lens can be utilized for color separation functions, while a second lens can be utilized for ray bending functions.

Consumers are most familiar with finding lens in cameras and video cameras. In these applications, there is typically no size restriction on the size of the lens assembly. However, there has been recent interest in designing cameras in electronic devices where cameras did not exist previously. These space critical applications have very strict size limitations for the lens assembly. The size requirement is often expressed as a distance between an aperture and a focal plane and is generally known as the "height". For example, one such application proposes to integrate a camera into a cell phone for video-conferencing capabilities. Such an application requires a height of no more than the average thickness of the cell phone, which as can readily appreciated, is much less than the height of most hand-held camera applications.

Unfortunately, the prior art lens designs have heights of about twice the size requirements of these space critical applications.

When designing a lens system under a strict height requirement, it is generally not possible to use more than a single lens. In a single lens design, there is a need to use a diffractive surface for performing color correction functions. One challenge of using a diffractive surface is to design the surface in such a way as to increase the diffraction efficiency. The diffraction efficiency is related to how well the lens places light on the focal plane at desired locations. For example, a very efficient lens converges the incident light rays at discrete points (known as spots) along the focal plane. As the diffraction efficiency of the lens decreases, the size of the spots increases. As the spot size increase, the resulting image loses clarity and become fuzzier.

Unfortunately, the prior art single lens designs exhibit low diffraction efficiency, thereby leading to a fussy image.

Another challenge in single lens design is that the image exhibits vignetting (or shadowing) of the corners of the image. Accordingly, it is desirable for the single lens design to have a mechanism that reduces the amount of vignetting (or shadowing) of the corners of the image.

Consequently, it is desirable to design a singlet that has excellent resolution over a large field of view and a small height to meet space critical imaging applications.

SUMMARY OF THE INVENTION

According to one aspect of the present invention, the lens includes a first surface for performing color correction functions and a second surface for primarily performing light ray bending functions. The first surface has diffraction efficiency improvement mechanism for improving the resolution of the lens. In one embodiment, the diffraction efficiency improvement mechanism is implemented with a portion of the first surface that has a slightly concave profile. This concave portion increases the diffraction efficiency by reducing the incident angle of the light ray with respect to the surface.

An important aspect of the present invention is that the height (i.e., the distance between the aperture and the focal plane) is small, thereby making the lens of the present invention suited for space critical imaging applications.

Another aspect of the present invention is the provision of a vignetting reducing mechanism. In one embodiment, the vignetting reducing mechanism is implemented by setting the distance between the aperture and the first surface of the lens to a predetermined distance. By setting this distance to the predetermined distance, the lens is made to be generally telecentric in nature, which reduces the amount of vignetting in the corners of the image. The telecentric nature of the lens is achieved by the lens design of the present invention by positioning the aperture with respect to the lens in such a way as to cause the chief ray to be generally perpendicular to the focal plane. By making the singlet telecentric, the lens of the present invention reduces vignetting or shadowing of the corners of the image.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A telecentric singlet having a small height for space critical applications is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Single Lens System 100

Figure 1:
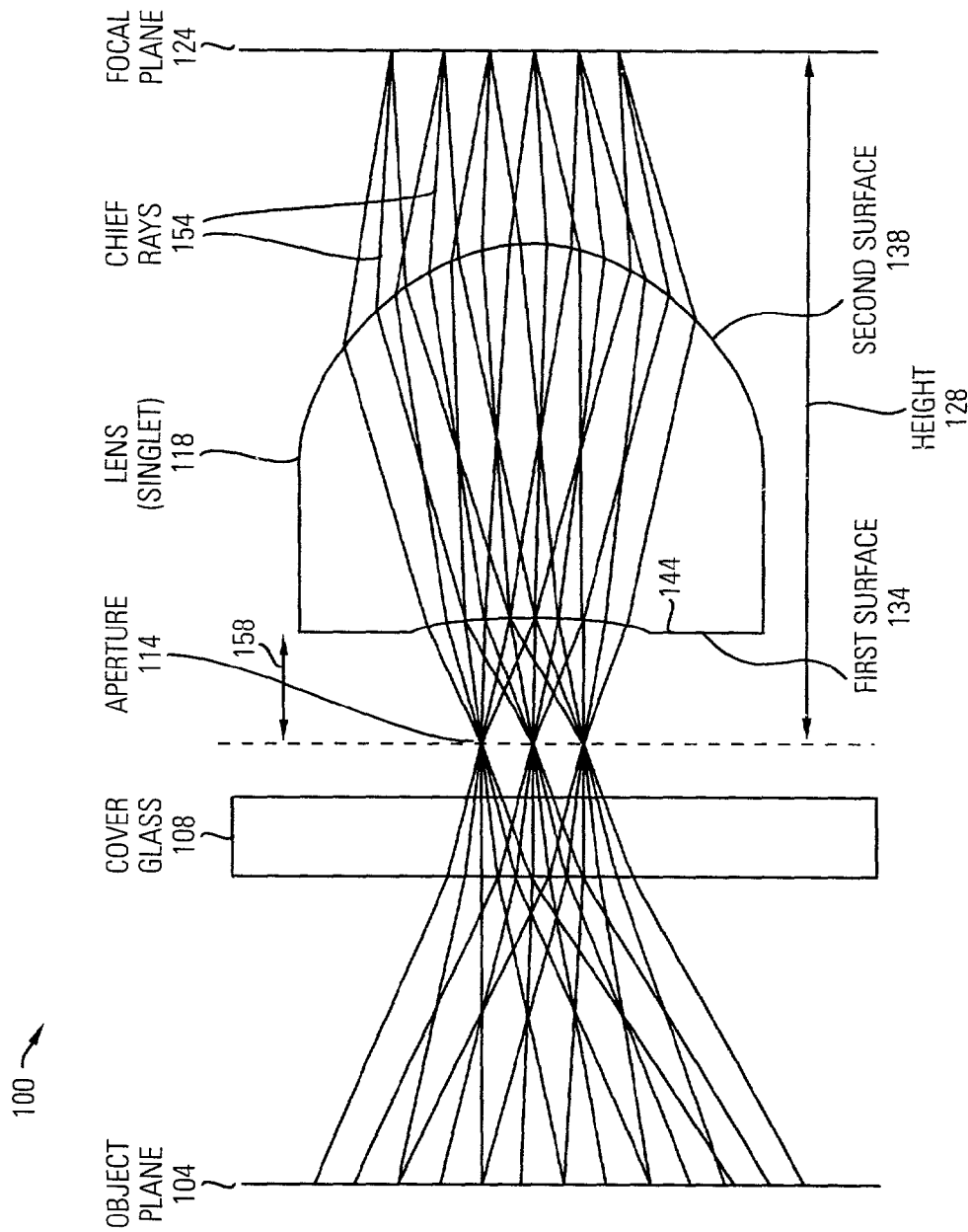
FIG. 1 illustrates a layout of a singlet in accordance with one embodiment of the present invention.

FIG. 1 illustrates a layout of a single lens system 100 in accordance with one embodiment of the present invention. The single lens system 100 includes an object plane 104, a cover glass 108, an aperture 114, a singlet 118, and a focal plane 124. A height 128 is defined as the distance between the aperture 114 and the focal plane 124. An important aspect of the present invention is that the single lens system 100 has a small height so that the single lens system 100 can be incorporated into space-critical applications. Exemplary height values for the optics of the present invention include 6.2 mm and 4.4 mm. Preferably, the height of the optics of the present invention is less than about 6 mm. In contrast, prior art systems have a typical height requirement for the optics that is about two times the height of the lens of the present invention.

The lens 118 includes a first surface 134 for performing color correction functions and a second surface 138 for performing light ray bending functions. The first surface 134 has a mechanism for improving the diffraction efficiency of the lens. The diffraction efficiency improvement mechanism can be implemented with a portion 144 of the first surface 134 that reduces the incident angle of the light ray with respect to the first surface 134. The portion 144 preferably has a concave profile (e.g., a slightly concave profile). Preferably, the first surface 134 is both diffractive and aspheric in nature, and the second surface 138 is primarily aspheric in nature.

Vignetting Reducing Mechanism

One aspect of the singlet design of the present invention is the telecentric nature of the singlet. The design of the present invention positions the aperture with respect to the lens in such a way as to cause the chief rays 154 to be generally perpendicular to the focal plane 124. The distance 158 between the aperture 114 and the first surface 134 of the lens 118 is set to a predetermined distance in order to make the lens 118 generally telecentric in nature in order to reduce the amount of vignetting in the corners of the image.

It is noted that diffractive lens or optics are elements that use diffraction to control wave fronts of light. Diffractive optical elements may be made from glass or plastic and include a large number of fine grooves that are designed as described in greater detail hereinafter. The diffraction is employed in the image forming process. The diffractive lens of the present invention can be implemented by diffractive optics that include, but are not limited to, zone plates, holographic lenses, kinoform lenses, binary optics, or a combination thereof.

By making the singlet telecentric, the lens 118 of the present invention reduces vignetting or shadowing of the corners of the image. A telecentric system is a system in which the entrance pupil and/or exit pupil is located at infinity. It is noted that a telecentric system has better illumination than a non-telecentric system.

Design of Lens 118

A broad optical spherical surface, which includes a plane surface and a conic surface, is well known and can be described by the following equation:

$$Z=cr^2/(1+sqrt(1-(1+k)c^2r^2)),$$

where "c" is the curvature of the reciprocal of the radius, "r" is the radial coordinate in lens units, and "k" is the conic constant. The conic constant "k" is less than −1 for hyperbolas, −1 for parabolas, between −1 and 0 for ellipses, 0 for spheres, and greater than 1 for ellipsoids. A plane is a special case for a sphere with an infinite radius of curvature.

Preferably, the first surface 134 and the second surface 138 are rotationally symmetric polynomial aspheric surfaces. These aspheric surfaces can be designed using an even aspheric surface model that uses only the even powers of the radial coordinate to describe the aspheric nature of the surface. It is understood by those of ordinary skill in the art that aspheric surfaces can also be designed using an odd aspheric surface model that uses only the odd powers of the radial coordinate can also be used to describe the aspheric nature of the surface.

The surface sag for an aspheric surface can be described by the following expression:

$$Z=cr^2/(1+sqrt(1-(1+k)c^2r^2))+a1r^2+a2r^4+a3r^4+a4r^8+\ldots+a\_nr^2n,$$

where "c" is the curvature of the reciprocal of the radius (also referred to as a base radius of curvature), "r" is the radial coordinate in lens units, and "k" is the conic constant that defines the conic surface type as described above. One manner in which the constants a1, a2 ... a_n are determined is now described.

It is noted that the simplest optical surface for the lens is a spherical surface. However, the spherical surface alone is often insufficient or inadequate to correct all the aberration in order to obtain a good image. In this regard, the aspheric constants are added one at a time to the basic spherical surface. Once added, the imaging quality of the resulting surface is examined. By iterating or repeating the steps of adding aspheric constants and examining the imaging quality of the resulting surface, the number and specific values of the aspheric constants are obtained.

Preferably, the first surface 134 and the second surface 138 are designed by using the above-noted expression. It is noted that the diffractive nature of the first surface 134 can be achieved by using different diffractive groove depth values and diffractive groove width values. In this regard, different diffractive groove depth values, different diffractive groove width values, and different combinations of these values are implemented in the design. Once implemented, the imaging quality of the resulting surface is examined. By iterating or repeating the steps of varying the groove depth values, diffractive groove width values, and the combinations thereof, and examining the imaging quality of the resulting surface, the final lens design is obtained.

Diffraction Efficiency Improvement Mechanism

One of the difficulties encountered when designing a lens system having a strict requirement in terms of a minimum height is that a designer is forced to employ a single lens. As noted previously, in a single lens design a diffractive surface is needed to perform color correction. One difficulty of designing a diffractive surface is that any lens tends to act like a prism to split the different color light and focus the different color light onto different positions on the focal plane. Consequently, a mechanism is needed to focus the different color light rays onto the same positions on the focal plane.

For example, most optical systems use polychromatic white light and contain glass whose index of refraction varies with wavelength. In these systems, several spots for a single object point are generated, each using a different wavelength. These systems are designed by adding one or more optical elements with different refractive indexes and surface curvatures in order to aim different wavelength light rays onto the same point in order to produce a sharp image. In this embodiment, the lens of the present invention includes a diffractive surface that performs color correction.

The present invention uses a first surface 134 with a portion 144 for focusing the different color light rays onto the same positions on the focal plane to increase the resolution of the lens.

According to one aspect of the present invention, the lens 118 includes a first surface 134 for performing color correction functions and a second surface 138 for performing light ray bending functions. The first surface 134 has a portion 144 having a slightly concave profile for increasing the diffraction efficiency by reducing the incident angle of the light ray with respect to the surface.

Spot Diagram of Lens 118

Figure 2:
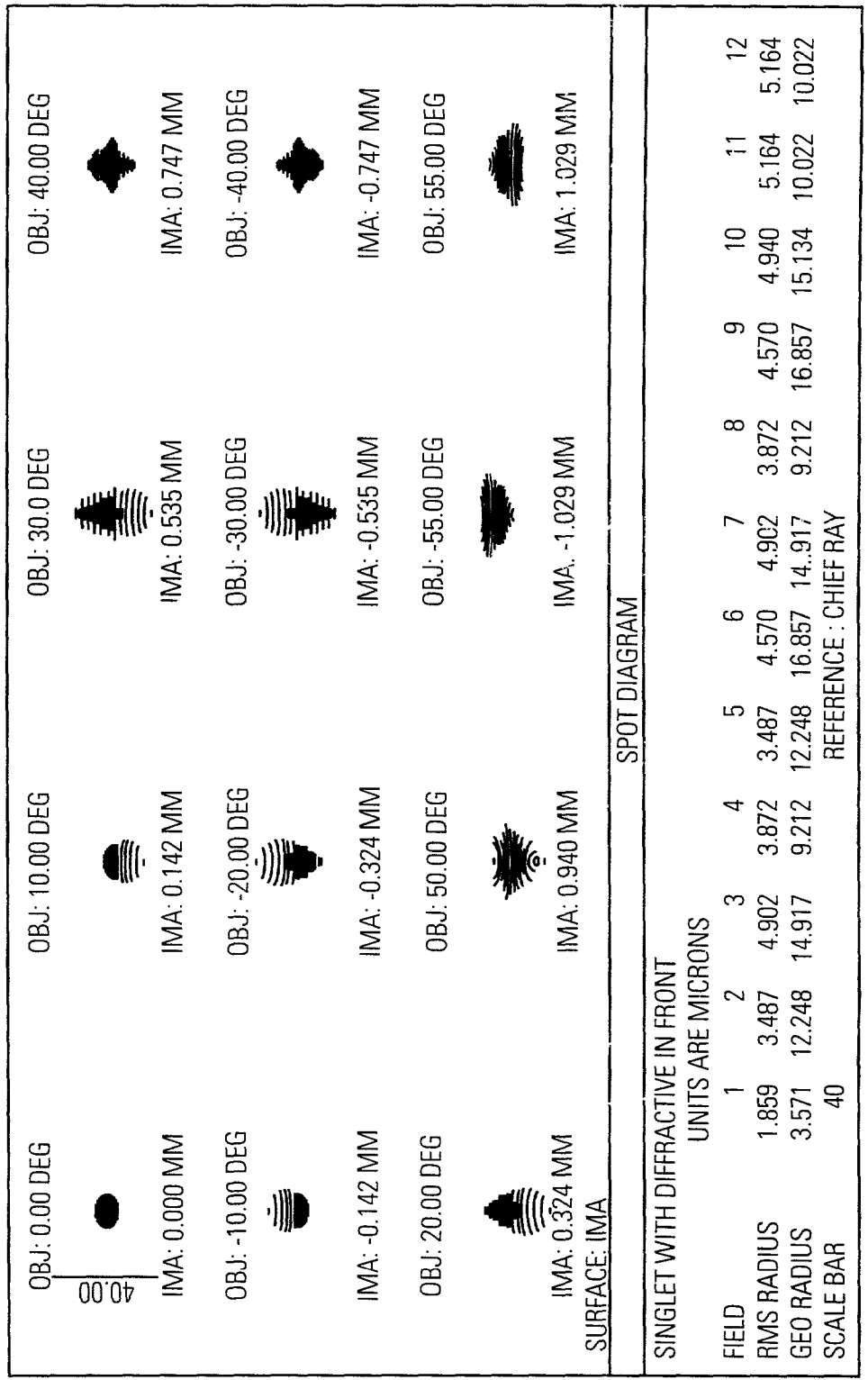
FIG. 2 is a spot diagram of the singlet of FIG. 1.

FIG. 2 is a spot diagram of the singlet of FIG. 1. A spot diagram is analogous to a geometric point spread function (PSF). It is noted that diffraction effects are ignored. The spot diagram illustrates the geometric image blur corresponding to a point object, such as a star. The spot diagram is utilized to examine or view the effects of aberrations.

A spot diagram is constructed by starting with a single object point that emits a plurality of monochromatic rays (e.g., a cone of rays). These rays are aimed to uniformly fill the entrance pupil. These rays are then traced by employing trigonometry through the lens and onto the image surface. The aggregate of the points where the rays pierce the image surface is a spot diagram. In other words, when light rays are the trajectory of photons, and when a single monochromatic object point uniformly illuminates the entrance pupil, then a spot diagram is a map of the impact points of the photons on the image surface. It is noted that diffractions effects are not considered in a spot diagram.

The object angle (OBJ) specifies the angle with respect to the optical axis at which light enters the first surface 134. The object angle is expressed in degrees. The IMA parameter specifies the distance in millimeters from the center of the focal plane to the location of the spot on the focal plane. This spot diagram illustrates twelve fields which are numbered from 1 to 12, that correspond to the sets of rays that are illustrated in FIG. 1 as groups of three generally parallel rays extending from the object plane 104 and passing the aperture 114. Each field has associated therewith a root mean square (RMS) radius (RMS RADIUS) and a geometric radius (GEO RADIUS) that are expressed in microns. The label OBJ refers to the object plane, and the label IMA refers to the imaging plane.

Referring to FIG. 2, the spot diagram illustrates that the lens 118 of FIG. 1 has excellent resolution across a wide field of view. For example, the spot size is less than about 5 microns for a full field of view of about 110 degrees. In this case, the imaging spot radius across the imaging plane (IMA) are very uniform and at about five microns. In contrast, prior art lens exhibit a similar spot size for a full field of view of only about 70 degrees.

Resolution

Figure 3:
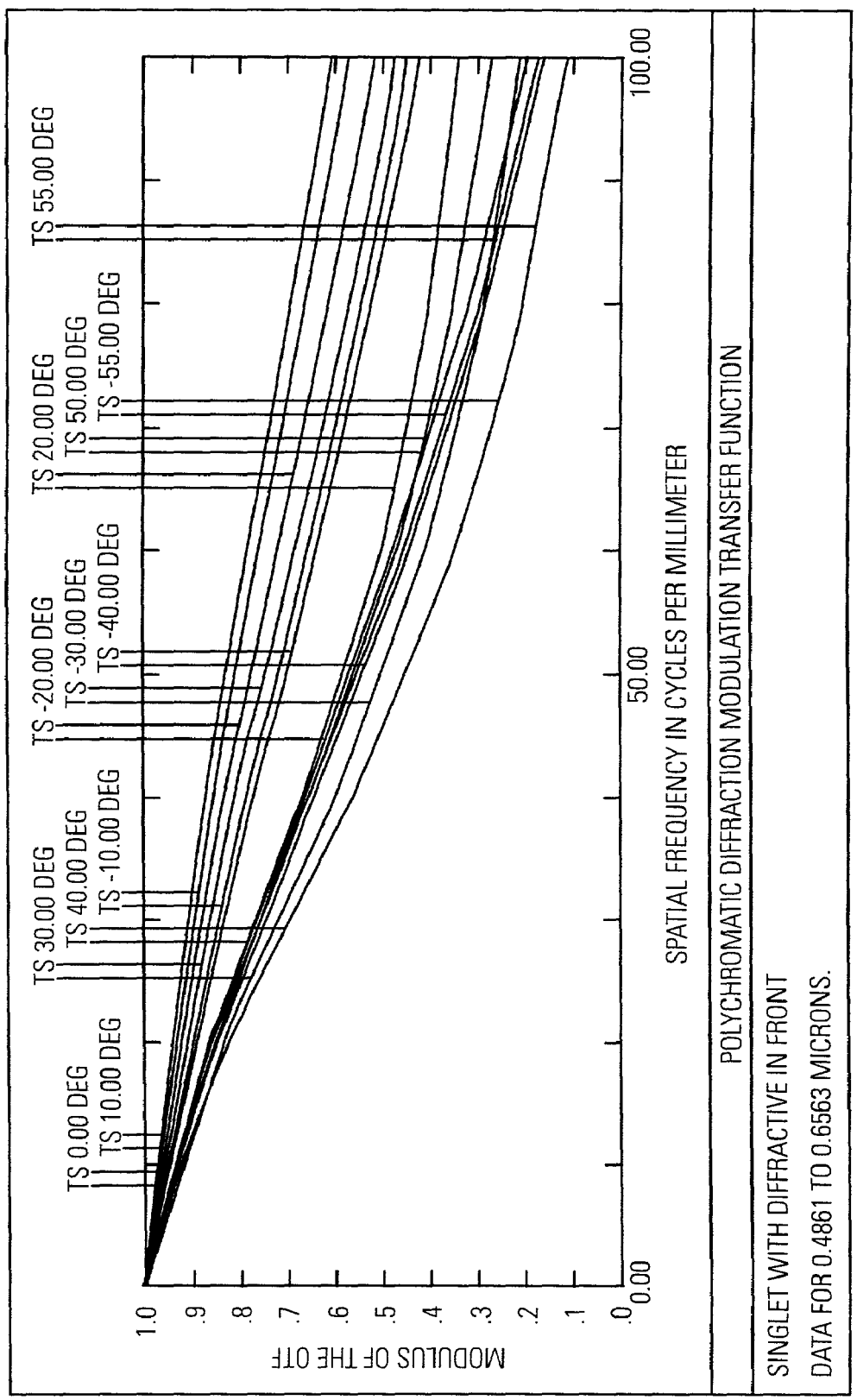
FIG. 3 illustrates a polychromatic diffraction modulation transfer function that is a measure of the resolution of the singlet of FIG. 1.

FIG. 3 illustrates a polychromatic diffraction modulation transfer function that is a measure of the resolution of the singlet of FIG. 1. The vertical axis represents the modulus of the optical transfer function (OTF), and the horizontal axis represents the spatial frequency in cycles per millimeter. FIG. 3 is a graph that illustrates the modulation transfer function of one embodiment of the lens. This graph indicates that the lens produces better than 15% of the modulation at 100 line-pair/mm across the sensor area.

Resolution relates to the best feature that an optical system can resolve. In digital imaging application, the number of pixels in the imaging sensor typically defines the resolution of the system. The optical system (e.g., lenses) needs to resolve each pixel to produce a sharp image. When the system's spot size is too large, then the image becomes fuzzy. The lens of the present invention produces a spot size of less than or equal to the pixel dimensions. As illustrated in FIG. 2, the lens of the present invention can produce a spot size with dimensions of less than a five micron by five micron square area.

Exemplary Digital Image Capture Device

Figure 4:
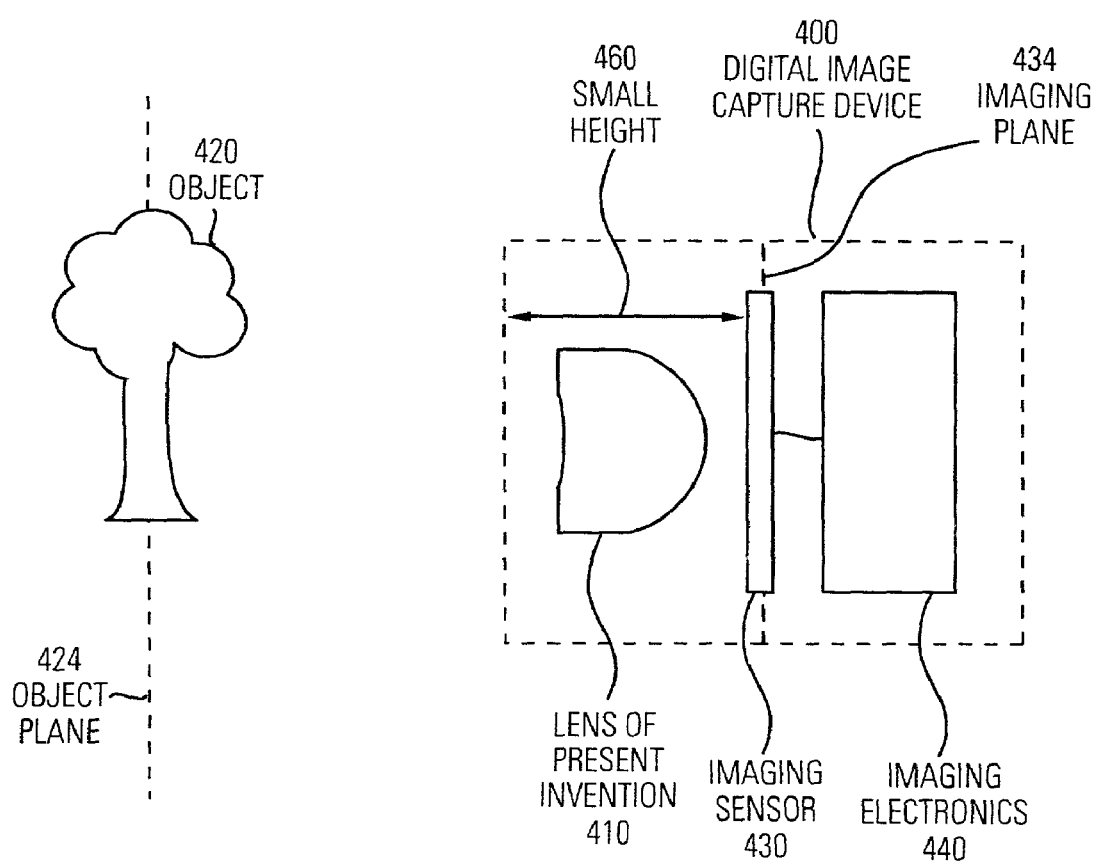
FIG. 4 illustrates an exemplary digital image capture device in which the singlet of the present invention can be implemented.

FIG. 4 illustrates an exemplary digital image capture device 400 in which the singlet 410 of the present invention can be implemented. The digital image capture device 400 can be used to capture an object 420 (e.g., a tree) that is disposed at an object plane 424. The digital image capture device 400 includes an imaging sensor (e.g., a sensor integrated circuit) 430 that is disposed at the imaging plane 434. The digital image capture device 400 also includes imaging electronics 440 that is coupled to the imaging sensor 430 for performing image processing on the captured image. The lens 410 of the present invention can be implemented in the digital image capture device 400 as shown. It is noted that the height 460 is small (i.e., the distance between the aperture and the imaging plane is greatly reduced as compared to prior art optics that use two or more lenses).

Since the single lens of the present invention has a small height, the optics of the present invention is especially suited for use in space-critical applications. These space critical applications can include electronic devices with small packaging requirements, such as cell phones and personal digital assistants (PDAs).

In one embodiment of the present invention, the single lens design (singlet) has a mechanism for reducing vignetting or shadowing of the corners of an image. The singlet of the present invention has a diffractive surface with high diffraction efficiency and provides a small spot size and excellent resolution over a large field of view.

In one embodiment, the lens of the present invention is a f2.8 wide field of view telecentric single lens design with a designed pixel (spot) size that is smaller than 5 microns across a 110 degree full diagonal field of view. By making the lens telecentric, the sensor is not subject to a color filter effect. The front surface of the lens is designed so that a curvature primarily performs the ray bending while a diffractive surface performs the color correction to reduce and minimize the problem of stray light. It is noted that such a single lens design is well suited for digital imaging applications (e.g., CIF digital imaging application) and other applications with strict space requirements.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A lens comprising:
   a) a first surface for primarily performing a color correction function, the first surface including a diffraction efficiency improvement mechanism that includes a diffractive portion of the first surface for increasing the diffractive efficiency of the lens; wherein the portion has a concave profile; and
   b) a second surface for primarily performing the light ray bending function.

2. The lens of claim 1 wherein the diffractive portion of the first surface reduces the incident angle of at least one light ray with respect to the first surface, thereby increasing the diffractive efficiency of the lens.

3. The lens of claim 1 wherein the lens has a spot size of less than about 5 microns for a full field of view of about 110 degrees.

4. The lens of claim 1 further comprising:
   c) an aperture; and
   d) a focal plane;
   wherein the distance between the aperture and the focal plane is less than about 6 mm.

5. The lens of claim 1 further comprising:
a vignetting reducing mechanism for reducing the shadowing in the corners of an image.

6. The lens of claim 5 wherein the vignetting reducing mechanism includes
a) an aperture positioned at a predetermined distance from the first surface of the lens; wherein the predetermined distance is a value that makes the lens telecentric.

7. The lens of claim 5 wherein the vignetting reducing mechanism includes
a) an aperture positioned at a predetermined distance from the first surface of the lens; wherein the predetermined distance causes a chief ray to be generally perpendicular to the focal plane.

8. The lens of claim 1 wherein the first surface is both aspheric and diffractive.

9. The lens of claim 1 wherein the second surface is generally aspheric.

10. The lens of claim 1 wherein the lens is made from one of a glass material and a plastic material; and wherein the lens includes one of zone plates, holographic lenses, kinoform lenses, binary optics, or a combination thereof.

11. A lens comprising:
a) a first optical means for primarily performing a color correction function, the first optical means including a diffraction efficiency improvement means that includes a diffractive portion of the first optical means for increasing the diffractive efficiency of the lens; wherein the portion has a concave profile; and
b) a second optical means for primarily performing the light ray bending function.

12. The lens of claim 11 wherein the diffractive portion of the first surface reduces the incident angle of at least one light ray with respect to the first surface, thereby increasing the diffractive efficiency of the lens.

13. The lens of claim 11 wherein the lens has a spot size of less than about 5 microns for a full field of view of about 110 degrees.

14. The lens of claim 11 further comprising:
e) an aperture; and
d) a focal plane;
wherein the distance between the aperture and the focal plane is less than about 6 mm.

15. The lens of claim 11 further comprising:
means for reducing the shadowing in the corners of an image.

16. The lens of claim 15 wherein the means for reducing the shadowing includes
an aperture positioned at a predetermined distance from the first optical means of the lens;
wherein the predetermined distance is a value that makes the lens telecentric.

17. The lens of claim 15 wherein the means for reducing the shadowing includes
an aperture positioned at a predetermined distance from the first optical means of the lens; wherein the predetermined distance causes a chief ray to be generally perpendicular to the focal plane.

18. The lens of claim 11 wherein the first optical means is both aspheric and diffractive and the second optical means is generally aspheric.

19. A lens comprising:
a) a first surface for primarily performing a color correction function, the first surface including a diffraction efficiency improvement mechanism; and
b) a second surface for primarily performing the light ray bending function
wherein the lens has a spot size of less than about 5 microns for a full field of view of about 110 degrees.

\* \* \* \* \*